(12) United States Patent
Mountain

(10) Patent No.: US 10,051,329 B2
(45) Date of Patent: Aug. 14, 2018

(54) APPARATUS, SYSTEMS, AND METHODS FOR SELECTING AND PRESENTING INFORMATION ABOUT PROGRAM CONTENT

(71) Applicant: DISH Technologies L.L.C., Englewood, CO (US)

(72) Inventor: Dale Llewelyn Mountain, Keighley (GB)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 13/710,069

(22) Filed: Dec. 10, 2012

(65) Prior Publication Data

US 2014/0165105 A1 Jun. 12, 2014

(51) Int. Cl.
*H04N 21/4722* (2011.01)
*H04N 21/422* (2011.01)
*H04N 21/81* (2011.01)
*H04N 21/845* (2011.01)

(52) U.S. Cl.
CPC ... *H04N 21/4722* (2013.01); *H04N 21/42203* (2013.01); *H04N 21/8133* (2013.01); *H04N 21/8456* (2013.01)

(58) Field of Classification Search
CPC .......... G06F 17/30864; H04N 21/4722; H04N 21/42203; H04N 21/8133; H04N 21/8455–21/8456
USPC ......................................................... 725/46
See application file for complete search history.

(56) References Cited

U.S. PATENT DOCUMENTS

| | | | |
|---|---|---|---|
| 7,660,416 B1 * | 2/2010 | Kline | G06Q 10/10 380/216 |
| 7,694,149 B2 * | 4/2010 | Niwano | G06F 21/10 713/176 |
| 8,285,925 B1 * | 10/2012 | Sorenson, III | G06F 3/0605 711/113 |
| 8,689,255 B1 * | 4/2014 | Gregov | H04N 21/4722 725/14 |
| 8,793,747 B2 * | 7/2014 | Yadavalli | H04N 21/25866 709/219 |
| 2003/0115289 A1 * | 6/2003 | Chinn | G06F 17/30067 709/219 |
| 2006/0259930 A1 | 11/2006 | Rothschild | |

(Continued)

FOREIGN PATENT DOCUMENTS

EP 2 645 733 A1 10/2013

OTHER PUBLICATIONS

Extended European Search Report, dated Mar. 5, 2014, for Application No. 13196296.1, 7 pages.

*Primary Examiner* — Nathan Flynn
*Assistant Examiner* — Tung T Trinh
(74) *Attorney, Agent, or Firm* — Seed IP Law Group LLP

(57) ABSTRACT

Information may be presented on a display device about program content substantially concurrently, substantially contemporaneously, or otherwise in conjunction with the presented program, or with portions of the presented program. This presentation of information about program content may occur dynamically in response to a voice query or other query from a user while the presented program is playing or paused on the same or different presentation device on which the information about the program content is being presented.

18 Claims, 9 Drawing Sheets

(56) References Cited

U.S. PATENT DOCUMENTS

| | | | |
|---|---|---|---|
| 2007/0214234 A1* | 9/2007 | Robinson | G06F 17/30014 709/217 |
| 2008/0018785 A1* | 1/2008 | Bennett | H04N 5/44 348/439.1 |
| 2008/0057922 A1* | 3/2008 | Kokes et al. | 455/414.1 |
| 2008/0183698 A1 | 7/2008 | Messer et al. | |
| 2008/0183757 A1* | 7/2008 | Dorogusker | G06Q 30/0241 |
| 2008/0199150 A1* | 8/2008 | Candelore | H04N 7/163 386/241 |
| 2008/0201299 A1* | 8/2008 | Lehikoinen | G06F 17/30038 |
| 2009/0027337 A1* | 1/2009 | Hildreth | G06F 3/011 345/158 |
| 2009/0077459 A1* | 3/2009 | Morris | H04N 5/44508 715/201 |
| 2009/0144312 A1 | 6/2009 | Patel | |
| 2009/0327894 A1* | 12/2009 | Rakib | G11B 27/34 715/719 |
| 2010/0125879 A1* | 5/2010 | Peterka | G06Q 30/00 725/87 |
| 2012/0147265 A1* | 6/2012 | Gu | H04N 5/4403 348/473 |
| 2012/0188940 A1* | 7/2012 | Agrawal | H04W 4/185 370/328 |
| 2013/0086105 A1* | 4/2013 | Hammontree | G06F 17/30864 707/769 |
| 2013/0141645 A1* | 6/2013 | Barnes | H04N 5/44582 348/564 |
| 2013/0347018 A1* | 12/2013 | Limp | H04N 21/4826 725/19 |

* cited by examiner

US 10,051,329 B2

APPARATUS, SYSTEMS, AND METHODS FOR SELECTING AND PRESENTING INFORMATION ABOUT PROGRAM CONTENT

TECHNICAL FIELD

The technical field relates to delivering media content to users, and, more particularly, to apparatus, systems and methods for providing information about the media content.

BRIEF SUMMARY

Apparatus, systems, and methods are disclosed for presenting information about program content. Some embodiments present information on a display device about program content substantially concurrently, substantially contemporaneously, or otherwise in conjunction with the presented program, or with portions of the presented program. For example, this presentation of information about program content may occur dynamically in response to a voice query from a user while the presented program is playing or paused on the same or different presentation device on which the information about the program content is being presented.

As one non-limiting example, if a viewer is watching a particular movie on their presentation device (e.g., television) and they see an actor in the movie who they recognize, but can't remember the actor's name, the viewer can say "who is that?" or "who is that man?" or "who's that?", etc., and the program content metadata including the name of the actor in the program who was displayed on the presentation device when the viewer asked the question will be automatically displayed on the presentation device 120, optionally and/or selectively along with other relevant information regarding the actor (i.e., filmography, awards, biography, etc.) and/or with an additional related interactive program.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
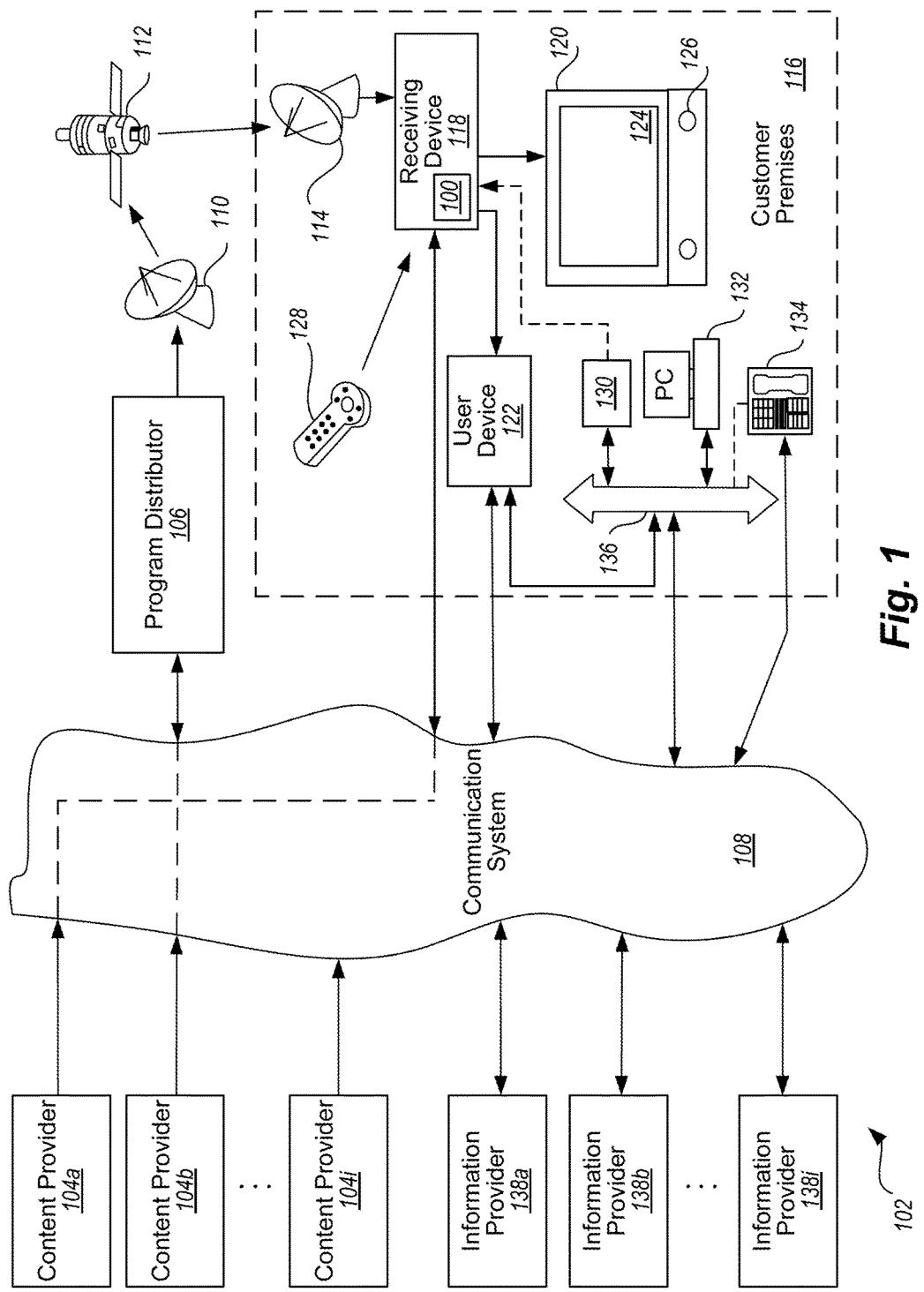
FIG. 1 an overview block diagram illustrating an exemplary communication network within which embodiments of the system for selecting and providing information about program content may be implemented.

FIG. 1 is an overview block diagram illustrating an exemplary communication network 102 within which embodiments of the system for selecting and providing information about program content 100 may be implemented. It is to be appreciated that FIG. 1 illustrates one example of a communications network 102 and that the various embodiments discussed herein are not limited to the exemplary network of FIG. 1. Communication network 102 may include a variety of communication systems and may use a variety of communication media including, but not limited to, satellite wireless media, cable media or any media over which communication of broadcast television programming, on-demand programming, and/or streaming media may occur, and/or over which Internet communication may occur.

Audio/Video/Data service providers, such as, but not limited to television service providers, provide their customers a multitude of audio/video and/or data programming (hereafter, collectively and/or exclusively "programming"). Such programming is often provided by use of a receiving device 118 communicatively coupled to a presentation device 120 configured to receive the programming.

Some embodiments of the system for selecting and providing information about program content 100 present information on the presentation device 120 about program content substantially concurrently, substantially contemporaneously, or otherwise in conjunction with the presented program, or with portions of the presented program. For example, this presentation of information about program content may occur in response to a query from a user while the program is playing or paused on the same or different presentation device on which the information about the program content is to be presented. For example, if a viewer is watching a particular movie on their presentation device 120 (e.g., television) and they see an actor in the movie who they recognize, but can't remember the actor's name, the viewer can orally say "who is that?" or "who is that man?" or "who's that?", etc., and then the program content metadata including the name of the actor in the program who was displayed on the presentation device 120 when the viewer asked the question will be automatically displayed on the presentation device 120. This presentation of the program content metadata may occur optionally and/or selectively along with other relevant information regarding the actor (i.e., filmography, awards, biography, etc.) and/or an additional interactive program.

The information presented about program content may include program content metadata received along with and/or as part of a received signal that also includes the program content (e.g., the signal received at receiving device 118 that is coupled to the presentation device 120). Additionally or alternatively, the information presented about program content may be electronically received from another remote or local source, and/or or electronically received from (or generated using) various different automated sources of information, including, but not limited to, remote servers, information providers 138, content providers 104, local cached data, databases in any location, data aggregation sources or services, etc. Some program content metadata is generally related to the entire program or large sections of the program and may be received, retrieved and/or stored up front before the program is presented, or during the presentation of the program, and will be available at any time during presentation of the program or for large portions of the program as it is being presented on presentation device 120.

In some embodiments, the system may instead or additionally be configured to receive, retrieve, store, cache and/or buffer particular program content metadata (e.g., on receiving device 100) contemporaneously with, substantially contemporaneously with, concurrently with, substantially concurrently with, shortly before and/or shortly after particularly related program content being presented (or being sent to be presented) on a presentation device 120. Such particular program content metadata is particularly related in some way to the program content currently being presented (or being sent to be presented) on presentation device 120.

The particular program content metadata may also be selectively buffered, cached, and/or otherwise stored (e.g., on receiving device 100) depending on how long and to what extent it is to be made available for quick (or quicker) access during presentation of the program or selected portions of the program. The system for selecting and providing information about program content 100 may be configured to selectively and/or dynamically cause this buffering, caching, and/or otherwise storing the particular program content metadata to depend on one or more of a variety of different factors. These factors include, but not limited to: length of program; available buffer or memory size; how the particular program content metadata is related to the particular program content; how long (or over how many video frames or program segments) and/or to what extent the person, thing or situation represented by the program content to which the particular program content metadata is related is being presented or otherwise referenced in the program content; whether the presentation of the program is currently in or will be in fast forward, slow motion, rewind or other "trick" play or presentation modes; an amount of the particular program content metadata to be received, retrieved, stored and/or buffered; whether, how and/or to what extent the program content metadata is continuously or periodically made available in the received signal containing the program content, etc.

For example, this program content metadata may include temporal metadata (i.e., program content temporal metadata) which is defined herein as metadata that is specifically associated with one or more particular points in the program, such as one or more points in the program at which program content is (or configured to be) presented that is related to or otherwise associated with the particular program content temporal metadata. For example, this may be a point in the program at which a particular actor appears during a scene in the program; a particular object appears in the scene in the program; when a particular line is said or other auditory event occurs, or other event or string of events has occurred in the program; etc. This particular point may continue until the actor or object leaves the scene, the situation represented by the program content being presented stops or ends, or some other selectable or set criteria is met or state is reached. A point in the program may refer to an exact moment in the program content or a particular video frame, or refer to an entire chronological segment or plurality of video frames of the program content. Referring to the example above, some examples of the temporal metadata associated with this point in the program may include, but are not limited to the actor's name, bio, the make and model of the object appearing at that point, other information regarding the actor or object, etc.

Such an association with one or more particular points in the program may be made in a variety of different ways by the system 100. For example, this program content temporal metadata may be associated with a particular frame or frames of video of the program content which are configured to be presented in a chronological order. The temporal metadata may be further associated with objects or people within, or situations represented by, particular frames of program video content. Additionally or alternatively, the program content temporal metadata may be associated with a chronological index corresponding to or identifying the one or more particular relevant points in the program via a timestamp, time offset, data amount offset, video frame number, data block number, etc. Additionally or alternatively, the program content temporal metadata may be associated with a point at which the program content temporal metadata is inserted into the signal including the program content, such that the program content temporal metadata will be received and/or become available substantially concurrently with, substantially contemporaneously with, shortly before or shortly after the presentation (or sending for presentation) of the program content to which the program content temporal metadata is related.

Additionally or alternatively, triggers configured to cause the system to obtain the corresponding program content temporal metadata (or other additional data) may be inserted into the signal that includes the program content, such that the corresponding program content temporal metadata will be obtained from another source in response to the associated trigger being received (e.g., by the receiver 100) in the program content signal (or the trigger otherwise activated by user input, etc.). Also, the triggers may be inserted into the signal that includes the program content such that the corresponding program content temporal metadata is received substantially concurrently with, substantially contemporaneously with, shortly before, or shortly after the presentation of the content of the program to which the program content temporal metadata is related. Such triggers may be used to obtain this and/or other program metadata, such as when the program first begins to be presented and/or in response to user input calling for such program content metadata.

In various embodiments, presentation of the information about program content may be in response to any variety or number of different user inputs or commands and/or queries, or in response to different types of user input commands and/or queries. These include, but are not limited to, voice commands and/or voice queries, spoken or written natural language queries, remote control device 128 commands, commands and/or voice queries originating from a remotely located or local user device 122 (e.g., a user mobile communications device), etc.

An additional interactive program may be accessed by the user and is presented on the presentation device 122 or other user device 122 in response to the same or another voice command or query; the user selecting the displayed information about program content (or relevant portion thereof)

using the remote control 128; and/or the user selecting another associated selectable element (e.g., an icon or menu item, etc.) presented on the display and/or other user device 122. The associated selectable element (e.g., an icon or menu item, etc.) presented on the presentation device 120 and/or other user device 122 may be based on, related to, and/or presented in response to the user input and/or in response to some or all of the information about program content currently being presented on the presentation device 120 or other user device 122. In some embodiments, some or all of the information about program content and/or the interactive program may be automatically displayed concurrently with, contemporaneously with, in conjunction with, or instead of, other additional information, electronic program guides, device menu systems, etc.

For example, the information automatically presented about program content, or a selectable interface element associated therewith, may be selectable by the user. Upon selection, further interactive programming (such as that related to the selected presented information regarding program content) is received, or otherwise retrieved from local or other storage, by a receiving device and loaded such that the interactive content is presentable on the presentation device in response to the selection. During the receiving and loading process of the interactive programming, the presentation of the program (and in some embodiments, the presentation of the information regarding program content) continues in an uninterrupted manner. When a sufficient portion of the interactive programming is available for presentation on the presentation device, the system may optionally cause the presentation to change from the presented program to the interactive program, or to presenting a combination thereof.

Receiving device 118 itself may interconnect to one or more communications media or sources (such as a cable head-end, satellite antennae, telephone company switch, Ethernet portal, router, server, off-air antennae, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120. The receiving device 118, any other devices shown in FIG. 1, and/or other devices or systems described herein may include at least one computer processor coupled to at least one non-transitory memory, and that is configured to execute computer-executable instructions to carry out, enable and/or otherwise perform applicable actions described herein of the system 100, communication system 102 and the different embodiments described herein.

Examples of a receiving device include, but are not limited to a television converter, receiver, set-top box, television receiving device, television receiver, television recording device, satellite set-top box, satellite receiver, cable set-top box, cable receiver, personal computer, media player, mobile device, tablet computing device, smart phone and/or television tuner. Accordingly, the receiving device 118 may be any suitable converter device or electronic equipment that is operable to receive programming. Further, the receiving device 118 may itself include user interface devices, such as buttons, switches a display and more include the presentation device 120. In many applications, a remote control device 128 is operable to control the presentation device 120 and other user devices 122.

Examples of a presentation device 120 include, but are not limited to, a television (TV), a personal computer (PC), a sound system receiver, a digital video recorder (DVR), a compact disk (CD) device, media player, mobile device, tablet computing device, smart phone, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118.

Customer premises 116 may include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, a twisted pair Ethernet, an intranet, a local area network (LAN) system, or the like, and may be wired or wireless. One or more endpoint devices, such as PCs, data storage devices, TVs, game systems, sound system receivers, receiving devices 118, user devices 122, Internet connection devices 130, digital subscriber loop (DSL) devices, wireless LAN devices, WiFi devices, Worldwide Interoperability for Microwave Access (WiMax) devices, or the like, are communicatively coupled to network 136 so that the plurality of endpoint devices are communicatively coupled together. Thus, the network 136 allows the receiving device 118 and the other interconnected endpoint devices to communicate with each other.

Embodiments of the system for selecting and providing information about program content 100 receive a program contained in a signal and also receive, at various times, at least one piece of information about program content (i.e., program content metadata), and/or an interactive program in the signal. Thus, when a user queries about something regarding the program as it is being presented, no channel switching and re-tuning is required to access the information about program content and/or the additional interactive program since the receiving device is tuned to a signal that has the program, the program metadata and in some embodiments, the additional interactive program therein. Thus, the viewer is presented with the information about program content in response to their query substantially seamlessly, with little or no noticeable time delay. In at least one embodiment, the additional interactive program relates to the program that is being presented and/or to the presented information about the program content being presented.

A plurality of content providers 104a-104i provide program content, such as video content and/or audio content, to a distributor, such as the program distributor 106. At least some of the content providers 104a-104i may include television stations which provide local or national video programming, special content providers which provide premium based programming or pay-per-view programming, and/or radio stations which provide audio programming. In addition, or in the alternative, at least some of the content providers 104a-104i may include those which provide on-demand services, streaming media services, multimedia file services and/or which provide audio, video, and other types of data services via Internet Protocol or other network protocol over the communication system 108 and/or other network infrastructure.

A plurality of information providers 138a-138i may also be coupled to communication system 108. Information providers 138a-138i may provide various forms of content and/or services to the various devices residing in the customer premises 116. For example, information provider 138a may provide requested information of interest to PC 132, user device 122 and/or receiving device 118. This information of interest may include some or all of the program content metadata (e.g., individually, in an aggregated form or on-demand, etc.) and/or other information related to the program. Information providers 138a-138i may further perform various transactions, such as when a user purchases a product or service via their PC 132, user device 122 and/or receiving device 118 related to and/or in response to a user command, the program and/or the program content metadata.

Program content comprising a program is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, cable networks, fiber optic networks, microwave networks, asynchronous transfer mode (ATM) systems, frame relay networks, packet switched networks, digital subscriber loop (DSL) systems, radio frequency (RF) networks, and satellite systems. Further, program content communicated from the content providers 104a-104i to the program distributor 106 may be communicated over various combinations of media. For example, a television broadcast station may initially communicate program content, via an RF signal or other suitable medium, which is received and then converted into a digital signal suitable for transmission to the program distributor 106 over a fiber optics network. As another nonlimiting example, an audio content provider may communicate audio content via its own satellite system to the program distributor 106.

The received program is converted by one or more devices (not shown) as necessary at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

An antenna 114 that is within reception range of the downlink signal communicated from satellite 112 receives the above-described downlink signal. The antenna 114 can be located at a customer premises 116. Examples of customer premises 116 include a residence, a business, a car, or any other suitable location operable to receive signals from satellite 112 or other communication systems. The received signal is communicated, typically over a hard-wire connection, to a receiving device 118 that converts the received signal into a signal suitable for communication to a presentation device 120 and/or a user device 122.

The receiving device 118 may receive content partially from, or entirely from, another source other than the above-described antenna 114. Other embodiments of the receiving device 118 may receive locally broadcast RF signals, and/or may be coupled to communication system 108 via any suitable medium. Non-limiting examples of media communicatively coupling the receiving device 118 to communication system 108 include cable, fiber optic, radio frequency, streaming or Internet media.

User device 122 may be any suitable device that is operable to receive a signal from the receiving device 118, another endpoint device, or from other devices internal and/or external to the customer premises 116. Additional non-limiting examples of user device 122 include user mobile devices, smart phones, tablet computing devices, media players, optical media recorders, such as a compact disk (CD) recorder, a digital versatile disc or digital video disc (DVD) recorder, a digital video recorder (DVR), or a personal video recorder (PVR). User device 122 may also include, but is not limited to, game devices, RF transceivers, and personal computers (PCs) or other computing devices. Practically any consumer or other electronics device may be considered as a user device 122 herein.

An interface between the receiving device 118 and a user (not shown) may be provided by a hand-held remote device 128. Remote 128 typically communicates with the receiving device 118 using a suitable wireless medium, such as infrared (IR), RF, audio, or the like. Remote 128 includes a plurality of buttons, controllers and/or actuators which each have an associated operating function which may be predefined, or change dynamically depending on the context in which they are used (also referred to as a "focus"). The remote 128 is used to communicate commands to the receiving device 118 when the buttons, controllers or actuators are actuated.

Other devices and/or input functionality (not shown) may also be communicatively coupled to the receiving device 118, presentation device 120 and/or user device 122, or may be part of the receiving device 118, presentation device 120 and/or user device (e.g., presentation device may include its own speakers and/or microphones 126) so as to enable various input from the user and/or provide output to the user. For example, this may include a microphone with noise canceling functionality to detect a viewer's voice commands and/or queries while the audio of the program is playing. This may additionally include voice command and/or query interpretation functionality (e.g., voice recognition functionality, natural language query analysis functionality, etc.) described further herein to interpret, translate and/or analyze voice queries to facilitate and/or enable the receiving device 118, presentation device 120 and/or user device 122 to search for, obtain, access and/or retrieve the desired information (e.g., information about content of a program).

Customer premises 116 may include other devices which are communicatively coupled to communication system 108 via a suitable media. For example, personal computer (PC) 132 may be communicatively coupled to the communication system 108 via the network 136. Alternatively, any of the devices in the customer premises 116 may be directly and/or indirectly connected to the communication system 108. For example, telephone 134 may employ a hardwire connection or an RF signal for coupling to communication system 108. Also, the user device 122, may be connected to the communication system 108 via a cellular signal, and/or via network 136. Also, the receiving device 118 may be connected to the network, such as, for example, via a wired or wireless router or other Internet or LAN connection device, such as wireless Internet connection device 130.

The above description of the communication network 102 and the various devices therein is intended as a broad, non-limiting overview of an exemplary environment in which various embodiments of the system for selecting and providing information about program content 100 may be implemented. The communication network 102 and the various devices therein, may contain other devices, systems and/or media not specifically described herein.

Figure 2:
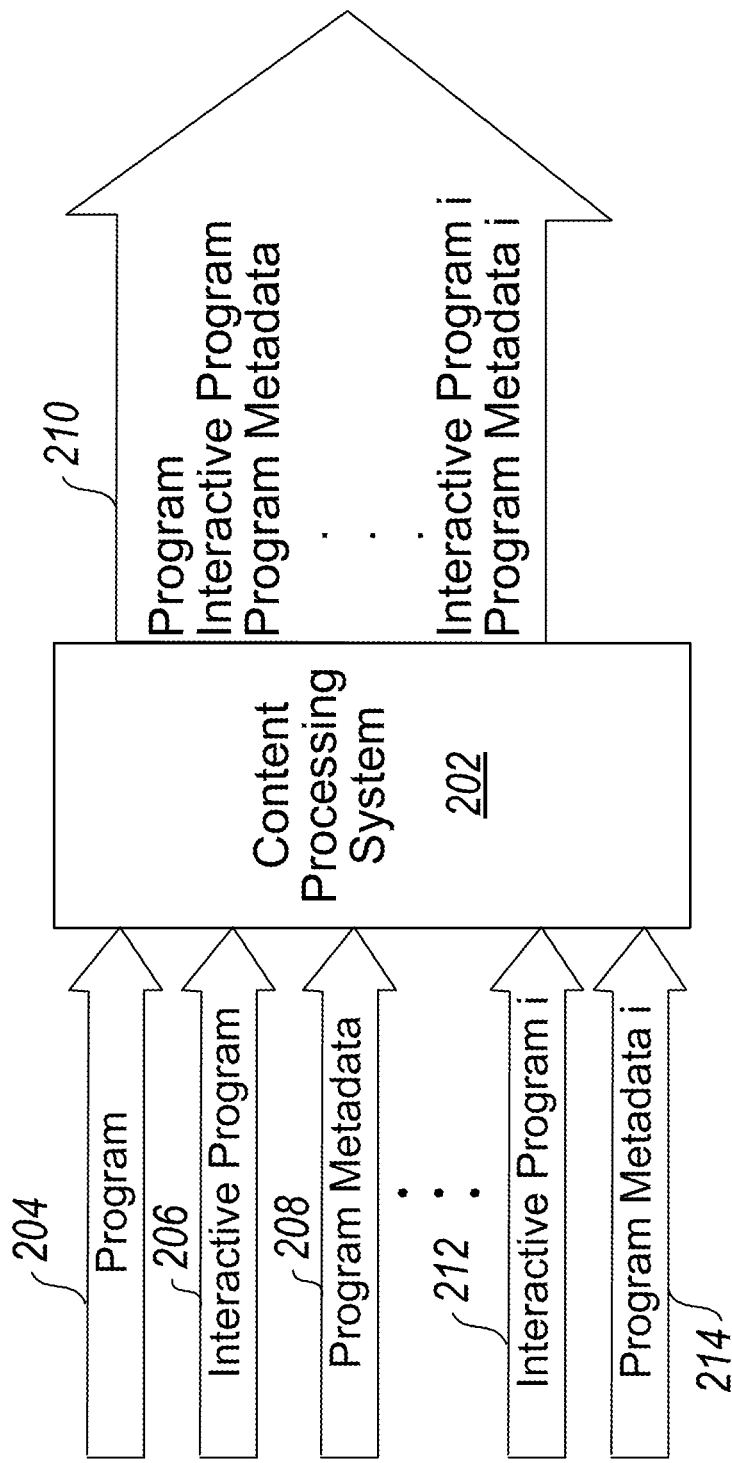
FIG. 2 is a block diagram of an exemplary embodiment of a content processing system operable to combine a program, at least one piece of information about the content of the program, and an associated interactive program into an output signal.

FIG. 2 is a block diagram of an exemplary embodiment of a content processing system 202 operable to combine program 204, at least one piece of information about the content of program 204 (i.e., program content metadata 208), and optionally an associated interactive program 206 into output signal 210. Signal 210 may also include other interactive programs 212 and/or other additional associated program content metadata 214. As noted above, in some embodiments, the same or any combination of different content providers 104a-104i and/or information providers 138a-138i may provide program 204, program content metadata 208 and/or interactive program 206 to the program distributor 106, via communication system 108 (FIG. 1). The subject matter of the interactive program 206 may be associated with the subject matter of the program 204, points within the program 204, or with the subject matter of corresponding program content metadata 208.

All or various pieces of program content metadata 208, 214 may be provided at times of interest in response to a query relative to the associated program that is being presented (or that is configured to be presented) on the presentation device 120. Program content metadata 208, 214 may be provided from time to time, periodically, or at a single time, as determined by a program provider 104, information provider 138, program distributor 106 and/or end user.

Program 204, along with a plurality of other programs, may be aggregated, interleaved, or otherwise combined (multiplexed) into signal 210. Accordingly, the signal commonly contains many programs, each carrying unique program content. Further, any given program (e.g., program 204) may have multiple pieces of program content metadata 208 and/or interactive programs 206 associated therewith and/or individually associated with related points within, segments within or portions of the program 204. That is, in some embodiments, the program 204, corresponding program content metadata 208, 214 and/or associated interactive programs 206, 212 received from the plurality of content providers 104a-104i and/or information providers 138a-138i is commonly communicated in a signal 210 from the program distributor 106. Also, corresponding program content metadata 208, 214 and/or associated interactive programs 206, 212 are associated, within the signal 210, with the corresponding program 204, points within, segments within, and/or portions of the program 204.

In some embodiments, at appropriate times, program content metadata 208 is added into the signal 210, or added into information from which signal 210 is generated. Thus, a portion of the program 204 is communicated at substantially the same time as the added corresponding program content metadata 208 is received by receiving device 118 in the same signal. The portion of the program 204 and information regarding to the added corresponding program content metadata 208 are then presented together on presentation device 120 in response to a user command or user query (e.g., a voice query 308 shown in FIG. 3).

The query may be received by the receiving device 118 directly or indirectly from a user 308. In some embodiments, the user command or user query 308 may be initially received and/or processed by another device than the receiving device 118 (e.g., user device 122, PC 132 or information provider(s) 138), and then a command is communicated to the receiving device 118 from the device that initially received and/or processed the user command or query to present particular program content metadata related to the initial user command and/or query. Additionally or in the alternative, in some embodiments, the information corresponding to the program content metadata 208 and or an additional interactive program 206 is presented on a different presentation device (e.g., on the display of user device 122 shown in FIG. 1) than that on which the program is being presented in response to the user command or query 308, or in response to and/or based on the particular program content metadata 208 that is being presented on the presentation device 120 in response to the user query 308 or other received command.

It is to be appreciated that a plurality of interactive programs 212 may be added into signal 210, or added into information from which signal 210 is generated. The other interactive programs 212 may be substantially the same as the above-described interactive program 206, such as when different types of receiving devices 118 require variations of a similar or common interactive program. Thus, the interactive program 212 is responsive to its respective associated program content metadata 214.

Alternatively, the other interactive programs 212 may provide different interactive content, such as when different entities wish to advertise their products at different times to the viewer or user (e.g., user 308 shown in FIG. 3) of the program 204. Such interactive programs 212 may have associated program metadata 214 added into the signal 210 at selected times. When the portion of the program 204 that is communicated with the corresponding program content metadata 214 is received by receiving device 118, the program 204 and information corresponding to the program content metadata are presented together on presentation device 120 in response to a user query or other command. In some situations, multiple different pieces of information about program content corresponding to different interactive programs may be concurrently or contemporaneously presented on the same presentation device and/or on various different presentation devices (e.g., user device 122).

For example, when a user 306 is watching a program on presentation device 120 and they see a particular vehicle presented on the presentation device, the user may say "what's that car?" In response, the make, model and year of the vehicle along with a message stating "push select on your remote for more information," or the like, may be presented in a streaming banner area (i.e., which is also referred to as a "crawl," "crawler," "slide," "ticker" or "news ticker") on the bottom or other area of the display 124 of presentation device 120 while the program continues to play. Also, the same or similar information may be sent to and/or automatically presented on the user device 122 (e.g., the user's mobile device), along with the interactive program 206, such as an application to shop for vehicles of that type, and/or listings or advertisements of vehicles of that type.

If the user 306 pushes a select button on their remote control 128 (or activates another designated input device or element) during, or otherwise in conjunction with, the presentation of the "push select on your remote for more information" message on presentation device 120 (or any other prompt or message in relation to the user query), any number of different actions may occur in response. Such actions include, but are not limited to, one or more of: launching and/or presenting the interactive program 206 on the receiving device 118 and/or other user device 122; presenting additional information regarding the associated program content metadata 208 on the presentation device 118 and/or other user device 122; presenting user prompts related to the user query 306, response to the user query and/or associated program content metadata 208 on the presentation device 118 and/or other user device 122; making a purchase or order related to the user query, response to the user query, associated program content metadata 208, and/or other purchase or order; recording and/or using data regarding user interest or preferences; recording and/or using data regarding relationships of user interest or preferences to the user query, response to the user query and/or associated program content metadata 208; making and/or recording determinations regarding user interest or preferences related to the user query, response to the user query and/or associated program content metadata 208; logging the user into an online account; prompting the user for credential information; presenting a selection menu related to the user query, response to the user query and/or associated program content metadata 208 on the receiving device 118 and/or other user device 122 (or sending the selection menu to such devices); sending to or presenting an advertisement on the receiving device 118 and/or other user device 122, presenting information answering an additional query on the receiving device 118 and/or other user device 122, (or sending such information to such devices), charging a user account; providing credits to a user account; obtaining, retrieving, request and/or send additional program content metadata; etc.

Figure 3:
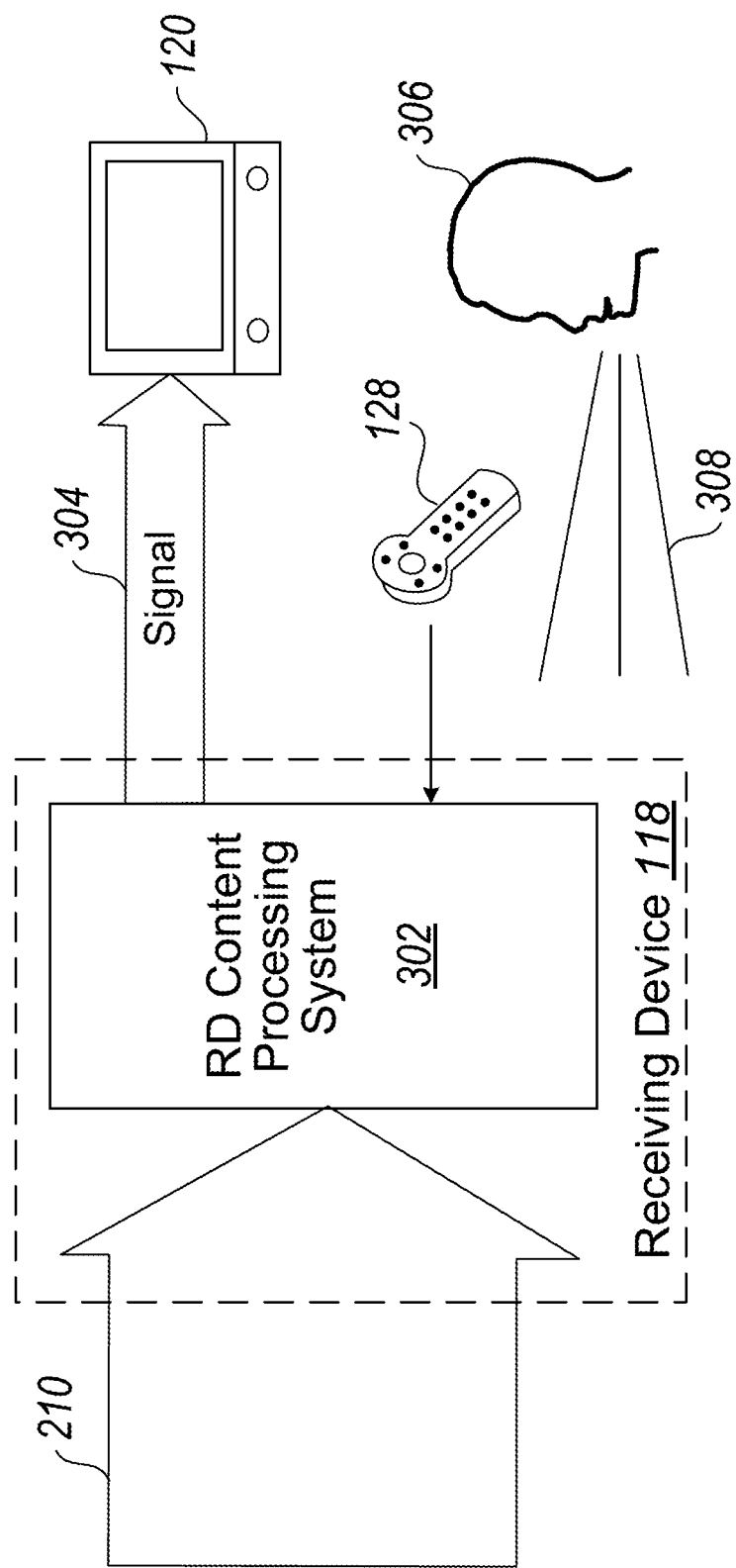
FIG. 3 is a block diagram of a receiving device (RD) content processing system, according to one example embodiment.

FIG. 3 is a block diagram of a receiving device (RD) content processing system 302, according to one example embodiment. RD content processing system 302 outputs a suitable signal 304 formatted for presentation device 120. Upon receipt of the signal 304, presentation device 120 presents video and/or audio information of signal 304.

Signal 304 is based upon a program selected by a viewer of presentation device 120. When no information about program content (i.e., program content metadata) is in signal 210, signal 304 includes the program of interest that has been selected for presentation by a viewer. As a non-limiting example, a viewer or user (e.g., user 308) may select a particular television program for presentation, such as program 204. It is appreciated that the selected program 204 is communicated in signal 210 to the receiving device 118. Signal 210 may include other programs therein in addition to the selected program 204.

At times, program content metadata 208, 214 may be in the signal 210. In response to receiving a user query (e.g., voice query 308) or other command, RD content processing system 302 communicates signal 304 to presentation device 120 having the selected program 204 and the program content metadata 208, 214 related to the user query. Accordingly, the selected program 204 and the related program content metadata 208, 214 are presented on presentation device 120. Additionally or alternatively, the selected program 204 and the related program content metadata 208, 214 are presented on and/or sent to user device 122, and/or another presentation or user device.

FIGS. 4A-4D illustrate an embodiment presenting information corresponding to a communicated program, information about program content and an interactive program related to the information about program content. As noted above, the RD content processing system 302 generates and communicates a signal to presentation device 120, user device 122, and/or another presentation or user device. When the program content metadata 208 is not present in signal 210, or a user query or other command has not been received regarding content of the program being presented, the generated signal 304 corresponds to the program content information 402 illustrated in FIG. 4A. For example, assuming that the program 204 in signal 210 corresponds to a movie, the generated signal 304 communicates video and audio information to the presentation device 120 so that the user is able to watch the movie (the program content 402).

At various times during or previous to the communication of the program 204, the program content metadata 208 may be added into signal 210. Timing of the addition of the program content metadata 208 into signal 210 is preferably coordinated with the subject matter of the program 204. (However, coordinated insertion of the program content metadata 208 into signal 210 is not essential. That is, the program content metadata 208 may be communicated at other times.)

As a simplified illustrative example, assume that the program 204 is an action film wherein the famous spy, in a driving scene, is driving a new prototype automobile. A manufacturer or seller of the prototype automobile may wish to have the user view information, an advertisement and/or a related interactive program pertaining to the prototype automobile if the user query received during that scene indicates the user may be interested in such an automobile or open to particular types of offers based on the user query and/or other demographic and user-related data. The system 100 described herein provides such functionality. In particular, the system 100 provides the user an opportunity to access the applicable program content metadata 204 (e.g., automobile year, make, model, other movies in which it was featured, etc.) in response to potential user queries regarding the automobile, and also an opportunity to access the associated interactive program 206, during or near to the showing of the prototype automobile in the action film.

In some embodiments, a marker, a time, or other indicia associated with the particular content metadata 204 regarding the prototype automobile is used to indicate to the RD content processing system 302 at which point during the action film, the particular content metadata 204 is available to be presented as (or included in) the information about program content 406 presented in response to the user query.

Figure 4A:
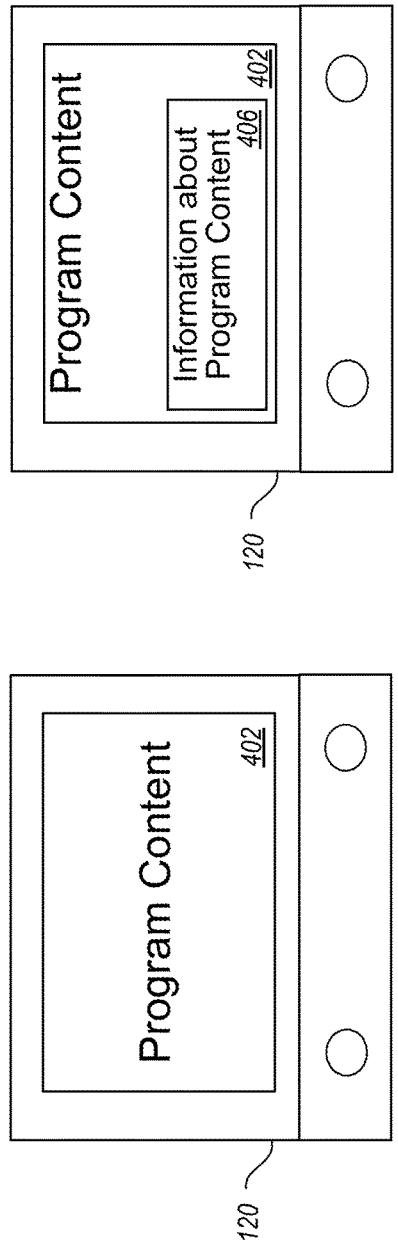
FIGS. 4A-4D illustrate an example embodiment presenting information corresponding to a communicated program, information about program content and an interactive program related to the information about program content.
Figure 4B:
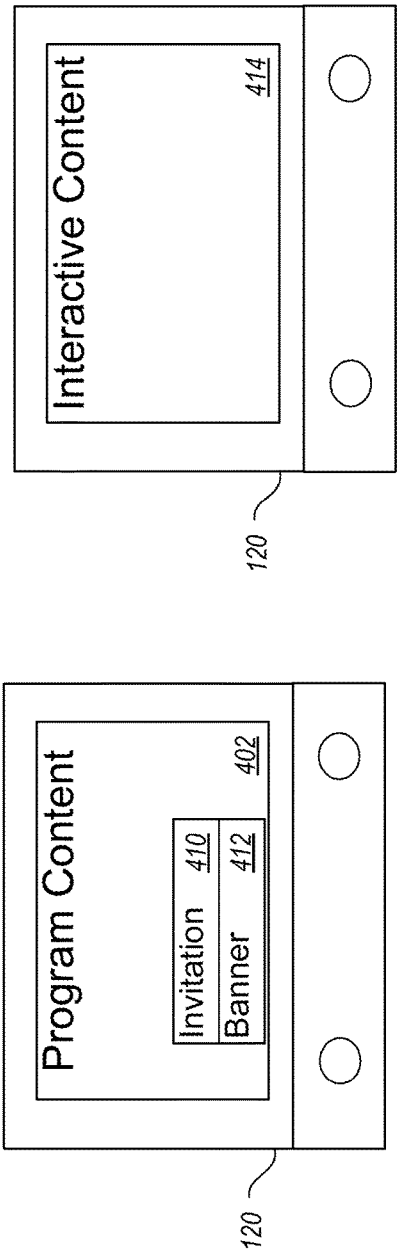

As noted above, in response to receiving a user query (e.g., voice query 308) regarding program content or other command, the RD content processing system 302 obtains an applicable or otherwise related response to the query or command by accessing applicable program content metadata 208, if any, that is received within signal 210. Then, the signal 304 communicated to presentation device 120 is changed such that the information about program content 406 is presented based on the applicable program content metadata 208, as illustrated in FIG. 4B. The information about program content information 406 may be concurrently presented with the program content 402 in a manner that does not significantly interrupt viewing of the presented program content 402. Any suitable form may be used for the presented information about program content 406, including alpha-numeric text, symbolic icons, and/or other graphics. Information about program content 406 may be presented at any suitable location on the display of presentation device 120. Any suitable size for the information about program content 406 may be used. The received user query or other command and/or accessing the related program content metadata 208 may also cause the RD content processing system 302 to change the signal to include audio information pertaining to the subject matter of the interactive program 206 and send such audio information to other devices (e.g., user device 122 shown in FIG. 1).

It is appreciated that the different forms, formats and types of the program content metadata and the presented information about program content 406 based on such metadata is nearly limitless. Accordingly, for brevity, such numerous possible information about program content 406 are not all described herein. It is to be appreciated that all such variations in the type and nature of the information about program content 406 is within the scope of this disclosure. However, some examples of the different forms, formats and types of the program content metadata and the presented information about program content 406 based on such metadata include, but are not limited to, one or more, or any combination of: information regarding people, products, objects, situations, and/or events depicted in and/or referenced by the program content 402; graphical labels displayed on various people, products, objects, situations, and/or events depicted in and/or referenced by the program content 402; banners, icons, boxes, crawls, labels, selectable graphical elements and/or tickers of any shape displayed anywhere on the presentation device 120 display and/or displayed with or adjacent to people, products, objects, situations, and/or events depicted in and/or referenced by the program content 402; historical data; filmographies; film, television program, play and/or other acting or production credits; biographical data; social media data regarding one or more users; social media data regarding people depicted in and/or referenced by the program content 402; commentaries; advertisements; offers; recommendations; channel recommendations, programming recommendations; information regarding currently available related programming and/or related programming currently being broadcast; reviews; data from books; electronic books; quotes; blogs; Web sites; program ratings; linked information; links to information; indexes to information; prompts; video data; audio data, etc.

In some embodiments, presentation of the information about program content 406 remains viewable for a brief period so as not to be distracting to the user. Accordingly, at some predefined time, the RD content processing system 302 changes the signal 304 to end presentation of the information about program content 406. However, such information about program content 406 may be stored, cached, buffered, etc., or otherwise may still be made available for a selected, determined, dynamically changing, or pre-defined period of time depending on device capabilities, user preferences and/or other criteria.

After ending the presentation of the information about program content 406, embodiments may keep the program content metadata 208 enabled. That is, the user is able to access the program content metadata 208 and/or the interactive program 206 by repeating the same input and/or providing further input to receiving device 118. For example, this access may be provided by selecting the presented information about program content 406, activating a button on the remote 128, responding to a presented or otherwise communicated invitation, providing input via another user device 122 (e.g., the user's mobile device), etc.

Figure 4C:
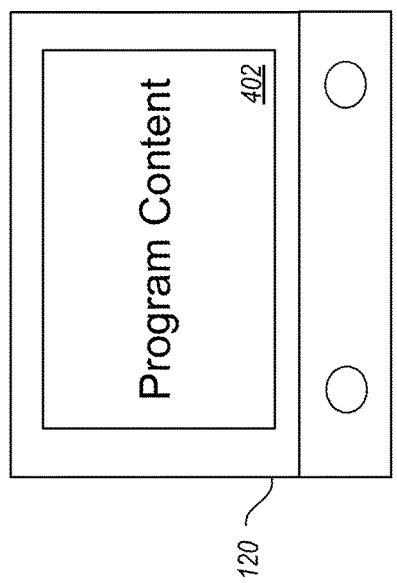

One exemplary embodiment is operable to present an invitation 410 along with a banner 412, as illustrated in FIG. 4C. Banner 412 may be presenting the information about program content 406 or be another graphical indicia presented to the user for a different purpose. For example, the banner 412 may include information describing the relevant program content in response to the user query, present advertisements and/or offers, present general program information such as that which is presented when the user actuates an "information button" or the like on remote 128 (FIGS. 1 and 3), and/or present any other types of information described herein. As another non-limiting example, the banner may describe related program content currently available or which will be available on alternative channels, and/or an electronic programming guide (EPG) or the like. The invitation 410 may be presented with any suitable banner 412.

Selection of the invitation 410 may be effected in a variety of manners. For example, a button 304, actuator, or the like on remote 128 may have its focus changed to correspond to selection of the invitation at times when the banner 412 is presented. Alternatively, the remote 128 may initially have its focus changed to correspond to selection of the banner 410 itself. "Focus" is the operational functionality associated with a particular button, actuator or the like. Focus may be a fixed functionality, or may be changed based upon the particular functionality required at that time. For example, "power" button may have a fixed functionality of turning on or off a device. An "enter" or "select" button may have a plurality of different situational dependent functions depending.

Other devices and or systems may be used to cause selection of the invitation 410. For example, special dedicated actuators, such as buttons or switches, may reside on remote 128, on receiving device 118, or on another device. A menu system or the like presented on presentation device 120, or presented on a display on remote 128, or other user device (e.g., a user's mobile device) may be used to select the invitation 410. It is appreciated that any suitable system and/or method of selecting the invitation 410 and/or banner 412 may be used.

Figure 4D:
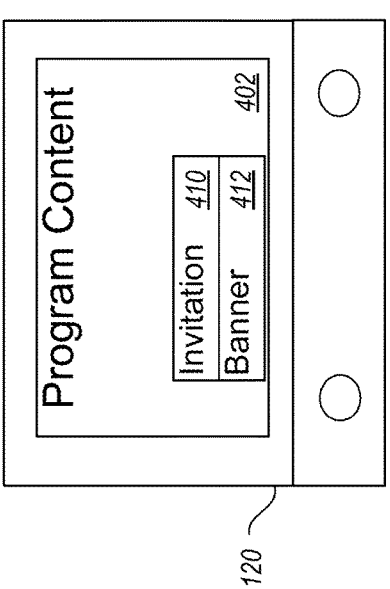

As noted above, embodiments present the interactive content information 414, after selection of the invitation 410, on presentation device 120, as illustrated in FIG. 4D. That is, after a portion of the interactive program 206 is downloaded, processed, and launched, the RD content processing system 302 changes the signal 304 to present the interactive content information 414 and/or additional related information about program content 406 in response to selection of the invitation 410 and/or other user input.

Figure 5:
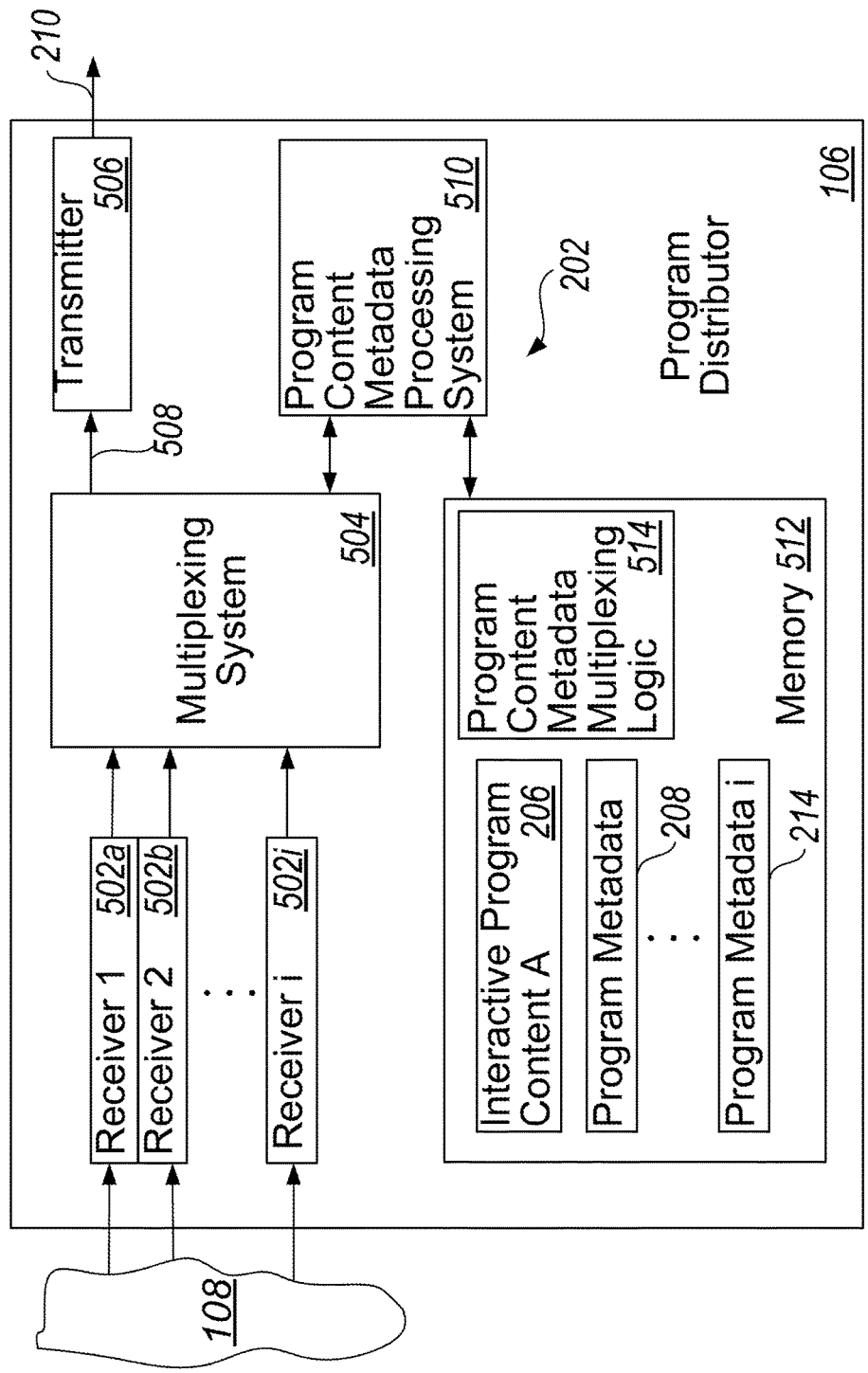
FIG. 5 is a block diagram illustrating an exemplary program distributor in communication with an embodiment of the system for selecting and providing information about program content.

FIG. 5 is a block diagram illustrating an exemplary program distributor 106 in communication with an embodiment of the system for selecting and providing information about program content 100. As noted above, program 204, and at various times, program content metadata 208 and interactive program 206 are combined and communicated in a single signal 210 to a receiving device 118. This function may be performed at the program distributor 106. However, in other embodiments this function may reside at the receiving device 118 and/or other suitable locations.

A plurality of receivers 502a-502i are communicatively coupled to communication system 108. The receivers 502a-502i receive program 204 provided by the content providers 104a-104i. Some receivers 502 also receive interactive program 206, 212, and/or program content metadata 208, 214, provided by the content providers 104a-104i, information providers 138a-138i, or another provider (not shown).

Multiplexing system 504 is communicatively coupled to the receivers 502, transmitter 506, and program content metadata processing system 510. Multiplexing system 504 generates a signal 508 with a plurality of programs, each program corresponding to unique program content associated with a channel. Further, multiplexing system 504 combines the interactive programs 206, 212 and/or program content metadata 208, 214 (FIG. 2) into the signal 508.

The signal 508 generated by the multiplexing system 504 is communicated to transmitter 506. Transmitter 506 communicates a signal 210 with the programs therein, via a suitable medium, to the receiving device 118. For example, the signal 210 with the programs may be communicated using a satellite signal, via satellite antenna 110, satellite 112 and antenna 114, as described above. The signal 210 with the programs may alternatively be communicated to the receiving device 118 via a cable system or the like in the communication system 108 to which the receiving device 118 is directly, or indirectly, coupled to.

As described herein, some embodiments combine the information about program content 208, 214 into the signal 508 when they are received from content providers 104a-104i. Or, the program content metadata 208, 214 may already reside in the information received from the content providers 104a-104i. The transmitter 506 receives the signal 508, and after processing and modification, communicates a corresponding signal 210. For example, if transmitter 506 communicates signal 210 to satellite 112 (FIG. 1), the signal 508 is processed and modified into a wireless signal. Alternatively, if signal 210 is communicated over a cable system, fiber optics system, or the like, the signal 508 is processed and modified into a signal suitable for communication over that particular system.

Furthermore, information providers 138a-138i or another provider (not shown) may separately provide program content metadata 208, 214. The separately provided program content metadata 208, 214 are then combined into the signal 508 at an appropriate time or so as to be coordinated with presentation of the program 204.

Such separately provided program content metadata 208, 214 may be stored in a convenient location, such as memory 512. As noted above, a marker, a time, or other associated indicia may be used to indicate to the content processing system 202 when or at which corresponding points during the program 204 the information about program content 406 is to be communicated in signal 210. Thus, the marker, time, or other indicia may be used to indicate to the content processing system 202 when or at which corresponding points during the program 204 multiplexing system 504 is to combine the program content metadata 208, 214 (FIG. 2) into the appropriate signal with the program 204, such that it will be available should a query be received related to such program content metadata 208, 214 during the corresponding point or points during the program. The separately provided program content metadata 208, 214 may be received in any suitable format, such as in a communication received from a server or other source via communication system 108 or in a physical media, such as, but not limited to, an optical storage media, smart card or other memory or storage device.

In some embodiments, the interactive program 206, 212 may already reside in the information received from the content providers 104a-104i. Thus, the interactive program 206, 212 is communicated along with the program 206, 212 in the signal 210 without additional processing on the part of the content processing system 202.

Alternatively, information providers 138a-138i or another provider (not shown) may separately provide the interactive program 206, 212. The separately provided interactive program 206, 212 may be received in any suitable format, such as in a communication received from communication system 108 or in a physical media, such as, but not limited to, an optical storage media, smart card or other memory or storage device.

The separately provided interactive program 206, 212 may be stored in a convenient location, such as memory 512. Thus, the interactive program 206, 212 does not have to be continuously provided with the program 204. Accordingly, a marker, a time, or other associated indicia may be used to indicate to the content processing system 202 when or at which corresponding points during the program 204 multiplexing system 504 is to retrieve the interactive programs 206, 212 such that they are included in signal 508 with the program 204, such that it is available at the applicable points during the program.

The above-described multiplexing operations wherein the program content metadata 208, 214 and/or interactive program 206, 212 are retrieved from memory 512 and combined into the appropriate signal 508 with the program 204 are controlled by the program content metadata processing system 510. Information about program content metadata multiplexing logic 514 may be retrieved and executed by the information about program content processing system 510 to perform the multiplexing operations. The information about program content metadata multiplexing logic 514 is illustrated as residing in memory 512 for convenience. Alternatively, the information about program content metadata multiplexing logic 514 may reside in another memory media (not shown), or may be combined with other logic.

For convenience, the program content metadata processing system 510 and memory 512 are illustrated and described as separately residing apart from the multiplexing system 504. It is appreciated that the program content metadata processing system 510 and/or memory 512 may reside in other locations, such as within multiplexing system 504, as a component of other systems, or as a stand-alone dedicated system or memory.

Multiplexer system 504 is illustrated for convenience as a separate component operable to receive one or more signals with program 204 from another multiplexer system, and operable to combine the program content metadata 208, 214 and/or interactive program 206, 212 (FIG. 2) into the appropriate signal with the program 204. As another example, such a multiplexer system 504 may be located at a content provider 104 or information provider 138, and combine the program content metadata 208, 214 and/or interactive program 206, 212 into the appropriate signal with the program 204. In another embodiment, two multiplexer systems 504 may be used, where a first multiplexer system 504 combines the interactive program 206, 212 into the appropriate signal with the program 204, and the second multiplexer system 504 combines the program content metadata 208, 214 into the appropriate signal with the program 204. The two multiplexer systems 504 may be in the same or different locations.

Figure 6:
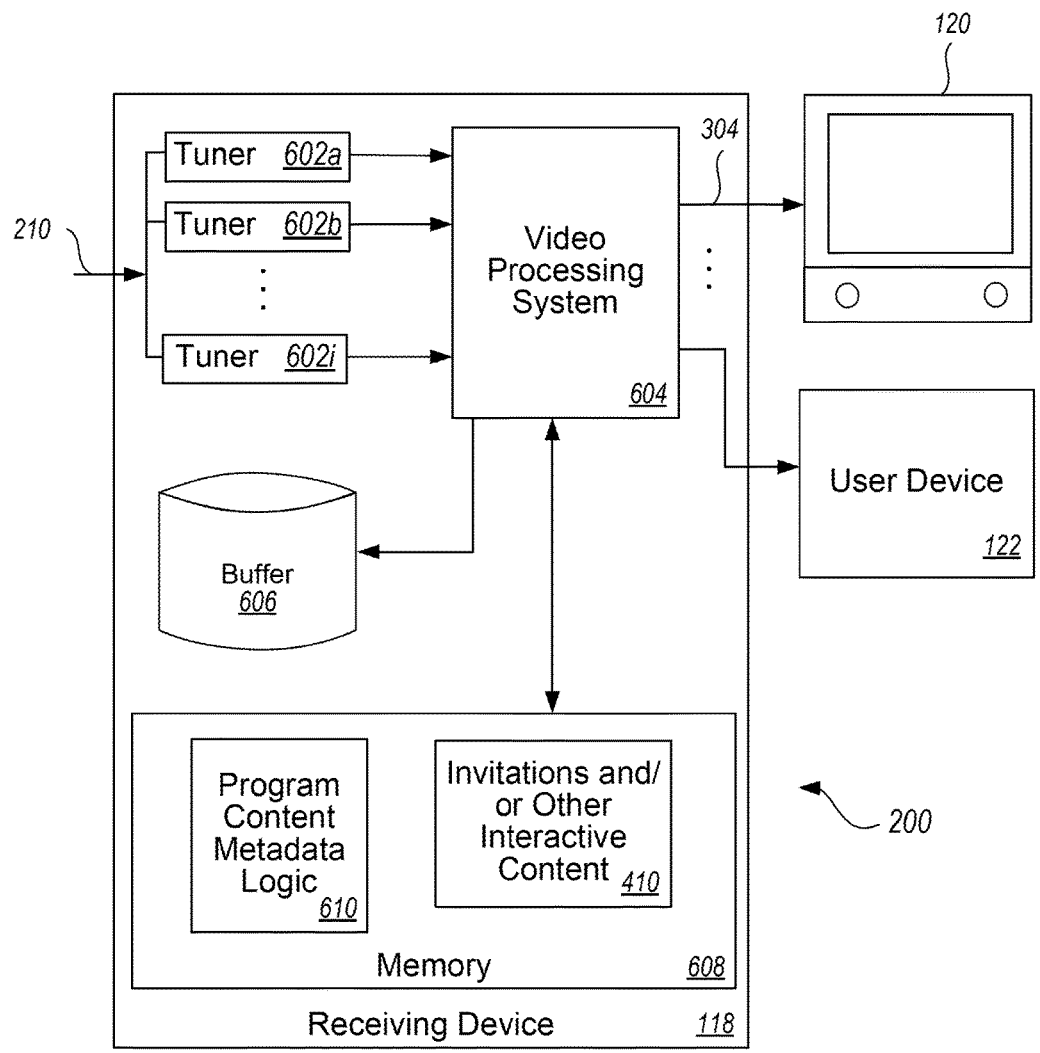
FIG. 6 is a block diagram illustrating an exemplary receiving device in which an embodiment of the system for selecting and providing information about program content may be implemented.

FIG. 6 is a block diagram illustrating an exemplary receiving device 118 in which an embodiment of the system for selecting and providing information about program content 100 may be implemented. The exemplary receiving device 118 may include a plurality of tuners 602a-602i, a video processing system 604, a buffer 606 and memory 608. Program content metadata logic 610 may reside in memory 608. Further, program content metadata invitations and other interactive content 410 may reside in memory 608.

In this exemplary embodiment, a tuner receives the signal 210 from the antenna 114 and tunes to the received signal 210 having the selected program 204 (FIG. 2). Video processing system 604 receives the signal from the tuner, and processes the received program 204 into the signal 304.

Some receiving devices 118 may include buffer 606. Buffer 606 may be a hard-drive memory system or other suitable memory system operable to store the program 204, the program content metadata 208 and/or the interactive program 206 from a received signal 210.

Video processing system 604 may further perform a variety of functions during the processing of the program which is ultimately communicated to the presentation devices 120 or user devices 122. Non-limiting examples include decryption of secure signals, demodulation of information in the received signals, formatting the information in the output signal into a digital or analog signal, preparing an electronic programming guide (EPG), or providing various "trick" functionalities that are presented to the user in selectable formats. Other functions not described above may also be performed by the video processing system 604.

At some point, program content metadata 208 is received in the signal 210. Video processing system 604 recognizes the program content metadata 208 and may store it in memory 608, at least temporarily. When presenting the program 204, the receiving device 118 then directly or indirectly receives a user query or other command (e.g., voice command), deciphers it and determines whether there is current program content metadata available corresponding to the point in time during the program at which (or near which) the user query was received. If such current program content metadata is available, the receiving device 118 may then determine the applicability, relevance and/or usefulness of currently available program content metadata on which a response to the query may be based, or to include in the response. This analysis may be based on the query or command received and/or additional information regarding the user or user demographics described herein.

The particular program content metadata is then selected to be included in, or used in the formation of, a response to the received user query to be displayed on the presentation device 120. One or more various steps or acts in this program content metadata selection process may be performed in different order and/or concurrently, performed by other devices, servers or information providers (e.g., information provider(s) 138, content provider(s) 104, user device 122, etc.), and the resulting data directly and/or indirectly communicated to the receiving device 118 via communication system 108 or via other communication channels. Such processes may include, but are not limited to, implementing various functionalities to interpret the query, select the appropriate program content metadata and form the response to be presented to the user. Such various functionalities may include one or more of: voice recognition, interpretation and/or voice processing functionality; language comprehension and/or interpretation functionality; natural language query processing, interpretation and/or deciphering functionality; relational database functionality; probabilistic and statistical model functionality; artificial intelligence functionality; neural networks; predictive model functionality; and Bayesian or other inference analysis functionality, etc. Once the response is formed using the selected program content metadata, the program content metadata processing system 510 changes the signal 304 such that the information about program content 406 (including the response and any other applicable information, invitations, prompts, banners or other graphical components) is presented on the presentation device 120 with the presentation of the program content 402.

In some embodiments, the information about program content 406 is presented for a relatively brief period. At the end the period, if no selection of the information about program content 406 or invitation 410 is received, the video processing system 604 changes the signal 304 so that the some or all of the information about program content 406 is no longer presented on presentation device 120. The length of the period in which the information about program content 406 is presented may be predefined. In some situations, the period may be a few seconds so as to provide sufficient notice to the user and sufficient time for the user to read and/or listen to the information presented in the information about program content 406, banner 412 and/or invitation 410 and/or effect selection of the information about program content 406, banner 412 and/or invitation 410, if desired.

In other situations, the information about program content 406, banner 412 and/or invitation 410 may automatically be presented during other relevant portions of the program and may contain the same and/or other relevant information, depending on how the information relates to the other relevant portions of the program. For example, the program may be presenting an object of interest and the program content metadata 208, related in some manner to the object of interest, is presented in response to a user query related to the object of interest. Then, each time the object of interest is presented in the program and/or other subsequent programs, additional information related to that object or related to how that object is related to the current scene is presented.

In various embodiments, the invitation 410 is not automatically presented on the presentation device 120 in response to a user query. Presumably, the user is aware of the previously presented corresponding information about program content 406. If the user later becomes interested in accessing the interactive content information 414 associated with the information about program content 406 (which is no longer presented), the user may access the interactive program by selection of the invitation 410. That is, the interactive program 206 may be selected for presentation by a user after the information about program content 406 is no longer presented on presentation device 120.

The invitation 410 may be retrieved from memory 608 and may optionally be presented with banner 412. A focus of a button or other actuator on remote 128, for example, may be operable to cause presentation of the invitation 410 on the presentation device 120. Thus, if the user wants to access the interactive content information 414 related to previously displayed information about program content 406, actuation of a corresponding button or actuator causes presentation of invitation 410 (and optionally, the banner 412). Selection of the invitation 410 causes presentation of the interactive content information 414 as described herein.

In one embodiment, information about program content 406 may remain active (by continued presentation of the information about program content 406 or through its invitation 410) until the user changes from the current channel associated with the information about program content 406, the relevant scene or portion of the program ends, and/or another query is received. Since the information about program content 406 no longer presumably pertains to the current channel, the information about program content 406, invitation 410 and/or banner 412 are deactivated. In some embodiments, the information about program content 406, invitation 410 and/or banner 412 may remain active for a predefined number of events, such as, but not limited to, a predefined number of channel changes or an ending of the program 204.

In some embodiments, if more recent program content metadata 208 is received, the previously received program content metadata 208 is deactivated. That is, more recent program content metadata 208 may replace a previously received program content metadata 208.

Some embodiments filter information from received program content metadata 208, such as based on a determination of whether a user has authorization to access the program content metadata 208 and/or interactive program 206. For example, access may be restricted due to the nature of the interactive program 206, such as adult program oriented interactive program. Or, the received program 204 may have access restrictions, such as premium or pay-per-view content, where access to the associated program content metadata 208 and/or interactive program 206 is also restricted. Or, the interactive program 206 itself may have access restrictions, such as a premium interactive program or pay-per-view interactive program. Access rights may be assessed by the receiving device 118 in any suitable manner to determine if the associated program content metadata 208 and/or interactive program 206 is accessible. If not accessible, the information about program content 406, banner 412 and/or invitation 410 may not be presented on presentation device 120. Or if presented, access to the interactive program 206 may be prohibited or denied using another suitable process. Some embodiments are operable to allow a user to select to pay for the interactive program 206.

Some receiving devices 118 include a pause feature or the like so that received program 204 may be paused or temporarily halted. For example, the program 204 may be saved into buffer 606 or another suitable memory media for later playback. In some embodiments, the program is automatically paused while the information about program content 406, banner 412, invitation 410 and/or interactive content 414 are being presented or interacted with. The program may then and resume after one or more of the information about program content 406, banner 412, invitation 410 and/or interactive content 414 are no longer being presented or interacted with. This may also be based on a user command to clear presented information about program content 406, banner 412, invitation 410 and/or interactive content 414, or to continue playing the program content 402. In some embodiments, the received interactive program 206 and/or program content metadata 208 are also saved into buffer 606 or another suitable memory media. In other embodiments, received interactive program 206 and/or program content metadata 208 are not saved.

In some embodiments, if a selection of particular presented information about program content 406, banner 412, invitation 410 and/or interactive content 414 is received, the saved information about program content 410 and/or other related information may continue to be saved for later use. For example, the user may view and/or interact with the interactive content 414, and thus interact with the interactive program 206, for some period of time, and then return to viewing the program content information 402. The saved information about program content 410 and/or other related information may be retrieved from memory 608 and presented if the user wishes to return to the interactive content 414.

Figure 7:
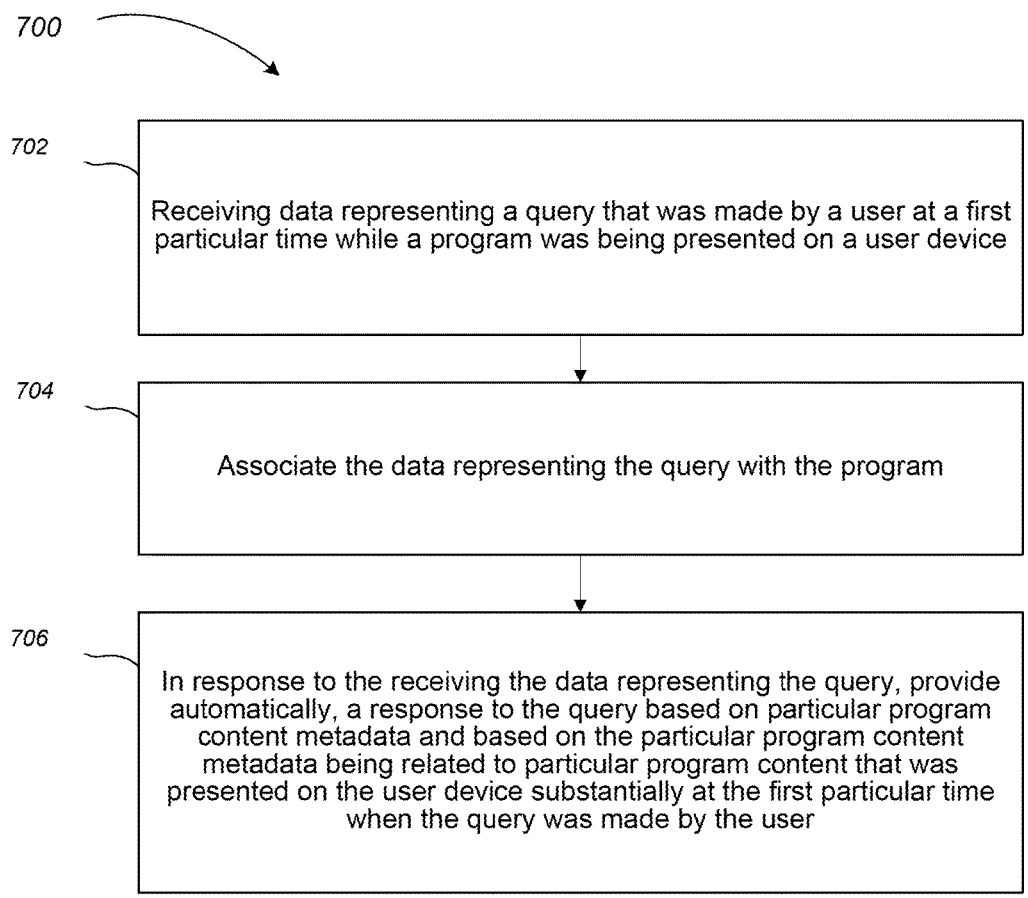
FIG. 7 is a flowchart illustrating a process providing a response to a query, according to an embodiment of the system for selecting and providing information about program content.
Figure 8:
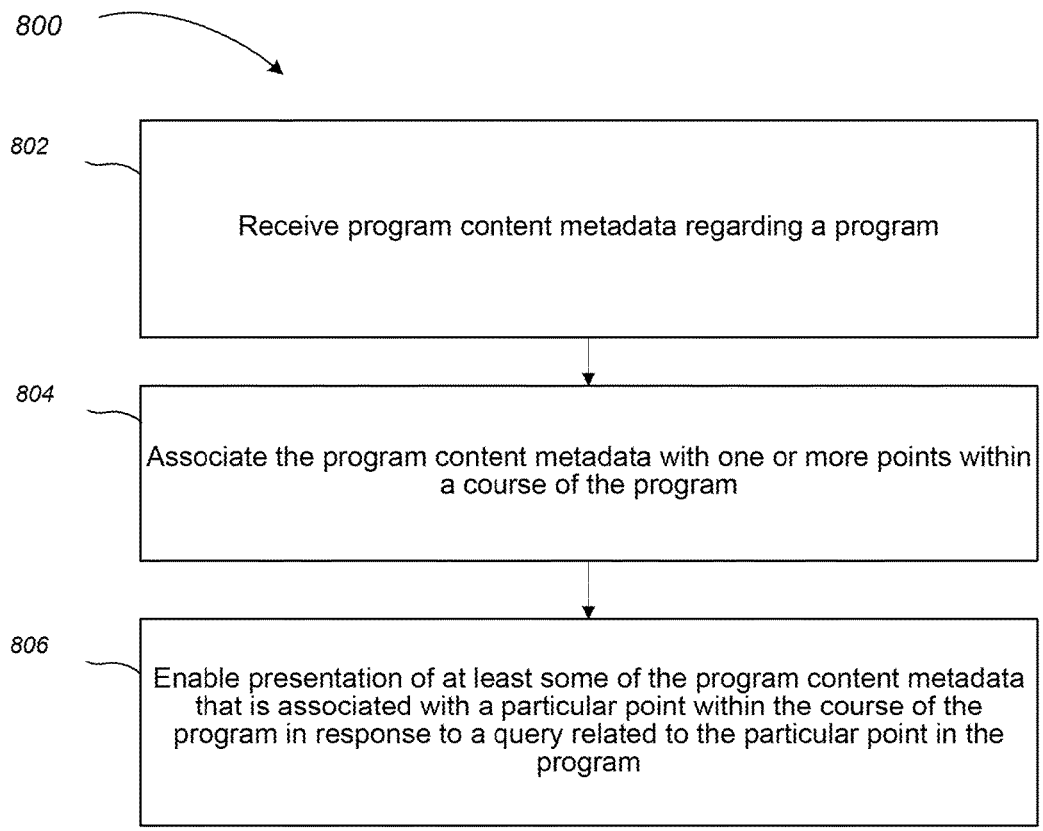
FIG. 8 is a flowchart illustrating a process enabling presentation of at least some of program content metadata, according to an embodiment of the system for selecting and providing information about program content.
Figure 9:
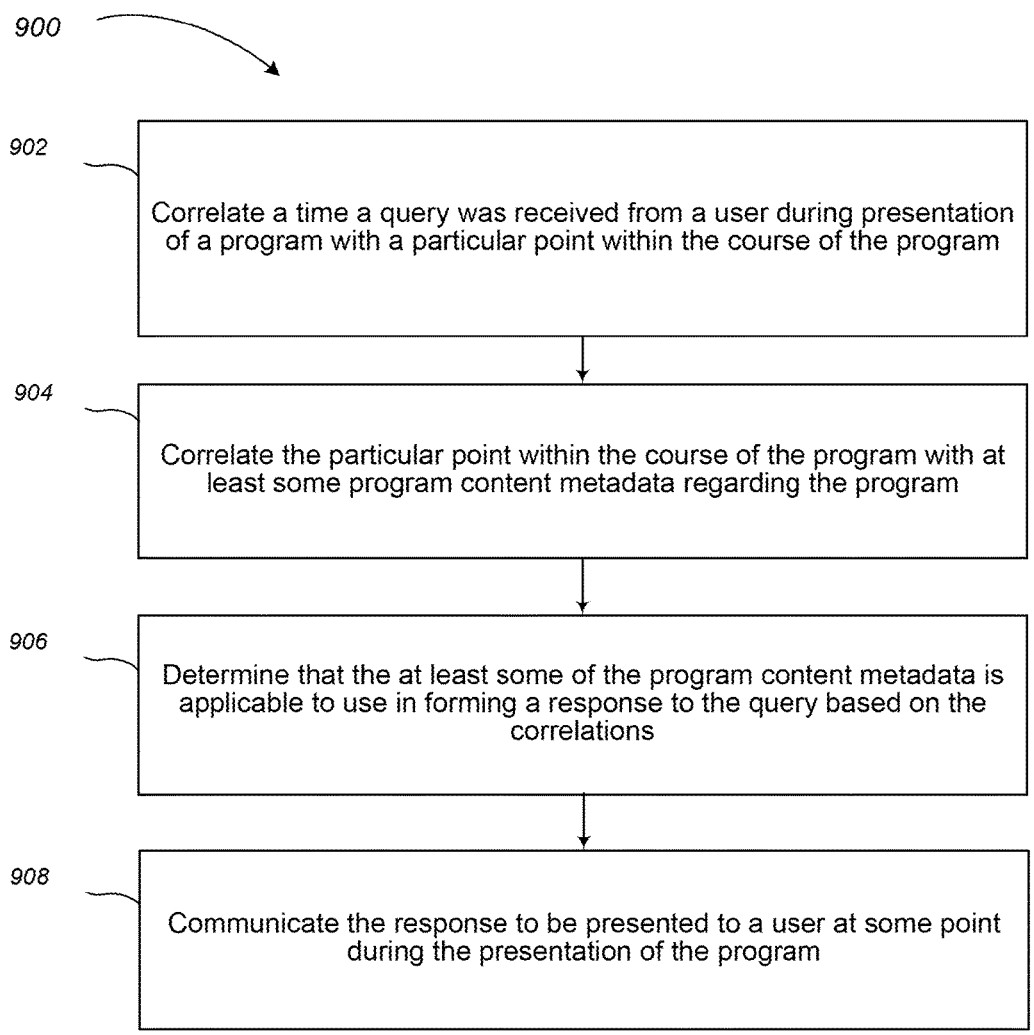
FIG. 9 is a flowchart illustrating a process communicating a response to be presented to a user, according to an embodiment of the system for selecting and providing information about program content.

FIGS. 7, 8 and 9 are flowcharts 700, 800 and 900, respectively, illustrating processes of a system for selecting and providing information about program content 100 (FIG. 1). In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

FIG. 7 is a flowchart illustrating a process 700 providing a response to a query, according to an embodiment of the system for selecting and providing information about program content.

At 702, the receiving device 118 receives data representing a query that was made by a user at a first particular time while a program was being presented on a user device.

At 704, the receiving device 118 associates the data representing the query with the program.

At 706, the receiving device 118, in response to the receiving the data representing the query, provides automatically, a response to the query based on particular program content metadata and based on the particular program content metadata being related to particular program content that was presented on the user device substantially at the first particular time when the query was made by the user.

In other embodiments, one or more of the various steps or portions of the steps of process 700 may be performed by various different devices or systems, such as, for example, any of the various devices and systems shown in FIG. 1.

FIG. 8 is a flowchart illustrating a process 800 enabling presentation of at least some of program content metadata, according to an embodiment of the system for selecting and providing information about program content.

At 802, the receiving device 118, program distributor 106 or information provider 138a receives program content metadata regarding a program.

At 804, the receiving device 118, program distributor 106 or information provider 138a associates the program content metadata with one or more points within a course of the program.

At 806, the receiving device 118, program distributor 106 or information provider 138a enables presentation of at least some of the program content metadata that is associated with a particular point within the course of the program in response to a query related to the particular point in the program.

In other embodiments, one or more of the various steps or portions of the steps of process 800 may be performed by various different devices or systems, such as, for example, any of the various devices and systems shown in FIG. 1.

FIG. 9 is a flowchart illustrating a process 900 communicating a response to be presented to a user, according to an embodiment of the system for selecting and providing information about program content.

At 902, the receiving device 118, program distributor 106 or information provider 138a correlates a time a query was received from a user during presentation of a program with a particular point within the course of the program.

At 904, the receiving device 118, program distributor 106 or information provider 138a correlates the particular point within the course of the program with at least some program content metadata regarding the program.

At 906, the receiving device 118, program distributor 106 or information provider 138a determines that the at least some of the program content metadata is applicable to use in forming a response to the query based on the correlations.

At 908, the receiving device 118, program distributor 106 or information provider 138a communicates the response to be presented to a user at some point during the presentation of the program.

In other embodiments, one or more of the various steps or portions of the steps of process 900 may be performed by various different devices or systems, such as, for example, any of the various devices and systems shown in FIG. 1.

While various embodiments have been described hereinabove, it is to be appreciated that various changes in form and detail may be made without departing from the spirit and scope of the invention(s) presently or hereafter claimed.

The invention claimed is:

1. A method for providing information about program content, comprising:
receiving, by a receiving device, a signal including a program, first program content metadata generally related to the program as a whole, second program content metadata specifically associated with one or more particular points of the program, and one or more interactive programs associated with the second program content metadata;

presenting the program on a user device;

receiving, by the receiving device, data representing a voice query that was made by a user at a first particular time during presentation of the program on the user device;

in response to the receiving the data representing the voice query that was made by the user at the first particular time during presentation of the program on the user device, associating the first particular time with when the voice query was made, accessing, by the receiving device, second program content metadata received in the same signal including the program related to a particular portion of the program that was presented substantially at the first particular time, the first particular time associated with the voice query and indicating when the voice query was made;

assessing, by the receiving device, access rights related with the second program content metadata and the interactive program; and in response to the receiving the data representing the voice query, and based on the assessed access rights, providing in a same signal, for presentation on a presentation device, the program, a response to the query based on the second program content metadata, and a user selectable element providing access to an interactive program, from among the one or more interactive programs, associated with the second program content metadata related to the particular portion of the program presented substantially at the first particular time indicating when the voice query was made; wherein providing the response to the voice query includes:

correlating the particular portion of the program with the first particular time indicating when the voice query was made by the user or with a second particular time when the data representing the voice query was received; and based on the correlation, obtaining the second program content metadata related to the particular portion of the program presented on the user device substantially at the first particular time when the voice query was made by the user;

determining that the second program content metadata received in the same signal including the program is related to the particular portion of the program presented on the user device by determining that a point in the program associated with the second program content metadata substantially corresponds to a same point in the program at which the voice query was made by the user while the program was being presented on the user device;

determining that the second program content metadata received in the same signal including the program is related to at least one particular person, object or situation to which the voice query pertains; and based on the correlation and the determination that that the second program content metadata received in the same signal including the program is related to the at least one particular person, object or situation to which the voice query pertains, using the second program content metadata in forming the response.

2. The method of claim 1 wherein providing the response to the query based on the second program content metadata includes providing the response during or substantially immediately after the particular portion of the program was presented on the user device.

3. The method of claim 1 wherein providing the response for presentation on the presentation device includes presenting the response substantially immediately after the query was made.

4. The method of claim 1 wherein the presentation device is the user device.

5. The method of claim 4 wherein providing the response for presentation on the presentation device includes providing the response for presentation on the user device along with subsequent program content as the program continues to be presented on the user device.

6. The method of claim 1 wherein the second program content metadata is associated with the particular portion of the program as a result of one or more associations being received in the signal that contains the program, the one or more associations being between the second program content metadata and the particular portion of the program.

7. The method of claim 1 wherein providing the response to the voice query includes:

determining that the second program content metadata contains particular information to be used in the response based on automated inference analysis of the data representing the received voice query.

8. The method of claim 1 wherein the second program content metadata is associated with the particular portion of the program as a result of when the second program content metadata was received within a same signal that contains the program.

9. The method of claim 1 further comprising, storing the second program content metadata substantially only during the presentation of the particular portion of the program to which the second program content metadata is related.

10. The method of claim 1 wherein the program is a satellite or cable broadcast program.

11. The method of claim 1 wherein the program is an audio program.

12. The method of claim 1 wherein the providing the response includes:

presenting the response on the user device; and presenting a prompt for the user to which the user may respond to receive additional information related to one or more of the response, the query and the particular portion of the program.

13. The method of claim 1 wherein the first program content metadata includes timestamp information.

14. A system for providing information about program content, comprising:

at least one processor; and at least one memory coupled to the at least one processor, wherein the at least one processor is configured to:

receive a signal including a program, first program content metadata related to the program, second program content metadata specifically associated with one or more particular points of the program, and one or more interactive programs associated with the second program content metadata;

receive data representing a voice query made by a user at a first particular time during presentation of the program;

access second program content metadata related to a particular portion of the program presented substantially at the first particular time;

assess access rights related with the second program content metadata and the interactive program; and based at least in part on the assessed access rights, provide in a same signal, for presentation on a presentation device, the program, the second program content metadata that is related to the particular portion of the program presented substantially at the first particular time, and a user selectable element providing access to an interactive program, from among the one or more interactive programs, associated with the second program content metadata related to the portion of the program presented substantially at the first particular time; wherein providing the second program content metadata that is related to the particular portion of the program includes:

correlating a time the query was received during presentation of the program with the particular portion of the program;

correlating the particular portion of the program with the second program content metadata;

determining that the second program content metadata is applicable to use in forming the response to the query based on the correlations by:

determining that the second program content metadata received in the same signal including the program is related to the particular portion of the program presented substantially at the first particular time by determining that a point in the program associated with the second program content metadata substantially corresponds to a same point in the program at which the voice query was made by the user while the program was being presented; and determining that the second program content metadata received in the same signal including the program is related to at least one particular person, object or situation to which the voice query pertains;

forming the response including the second program content metadata received in the same signal including the program; and communicating the response including the second program content metadata received in the same signal including the program to be presented to a user.

15. The system of claim 14 wherein providing the second program content metadata that is related to the particular portion of the program includes:

electronically communicating associations of particular pieces of the second program content metadata each with a respective portion of the program to a receiving device or to the presentation device.

16. The system of claim 15 wherein the electronically communicating associations of particular pieces of the second program content metadata each with the respective portion of the program to a receiving device or the presentation device includes:

communicating the associations of particular pieces of the second program content metadata each with one or more respective portions of the program to the receiving device or the presentation device in the same signal that contains content of the program.

17. A non-transitory computer readable medium having computer executable instructions thereon that, when executed by a computer processor, cause the computer processor to:

correlate a time a voice query was received from a user during presentation of a program with a particular portion of the program;

correlate the particular portion of the program with specific program content metadata regarding the program, the specific program content metadata being received in a same signal with the program content;

determine that the specific program content metadata received in the same signal with the program content is applicable to use in forming a response to the query based on the correlations by:

determining that the specific program content metadata received in the same signal including the program content is related to the particular portion of the program presented by determining that a point in the program associated with the specific program content metadata substantially corresponds to a same point in the program at which the voice query was made by the user while the program was being presented; and determining that the specific program content metadata received in the same signal including the program content is related to at least one particular person, object or situation to which the voice query pertains;

assess access rights related with the specific program content metadata and an interactive program associated with the specific program content metadata; and provide, based at least in part on the assessed access rights, for presentation to the user during the presentation of the program, the program, the response to the query, and a user selectable element providing access to the interactive program associated with the specific program content metadata.

18. The non-transitory computer readable medium of claim 17 wherein the correlating the particular portion of the program with the specific program content metadata includes:

receiving associations of particular pieces of the specific program content metadata each with a respective portion of the program as the program is being presented to the user;

searching the associations of particular pieces of the specific program content metadata to find which of the particular pieces of the specific program content metadata is associated with the particular portion of the program that is correlated to the time the query was received from the user; and determining that the particular pieces of specific program content metadata found associated with the particular portion of the program are the specific program content metadata that are correlated with the particular portion of the program.

* * * * *